United States Patent
Kodama et al.

(10) Patent No.: US 10,100,772 B2
(45) Date of Patent: Oct. 16, 2018

(54) FUEL INJECTION CONTROL DEVICE AND FUEL INJECTION CONTROL METHOD

(71) Applicant: NISSAN MOTOR CO., LTD., Yokohama-shi, Kanagawa (JP)

(72) Inventors: Takayoshi Kodama, Kanagawa (JP); Takao Inoue, Kanagawa (JP); Ryo Uchida, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/735,248

(22) PCT Filed: Jun. 12, 2015

(86) PCT No.: PCT/JP2015/067033
§ 371 (c)(1),
(2) Date: Dec. 11, 2017

(87) PCT Pub. No.: WO2016/199297
PCT Pub. Date: Dec. 15, 2016

(65) Prior Publication Data
US 2018/0171926 A1  Jun. 21, 2018

(51) Int. Cl.
*F02D 41/30* (2006.01)
*F02B 3/02* (2006.01)
(Continued)

(52) U.S. Cl.
CPC ............ *F02D 41/3005* (2013.01); *F02B 3/02* (2013.01); *F02B 17/005* (2013.01); *F02D 41/401* (2013.01); *F02F 1/242* (2013.01); *F02F 3/28* (2013.01); *F02D 2041/389* (2013.01); *F02F 2001/241* (2013.01)

(58) Field of Classification Search
CPC . Y02T 10/44; Y02T 10/123; F02D 2041/389; F02D 41/3094; F02D 41/3005; F02D 41/401; F02B 3/02; F02B 17/005; F02F 1/242; F02F 3/28
See application file for complete search history.

(56) References Cited

U.S. PATENT DOCUMENTS

| | | |
|---|---|---|
| 2003/0200952 A1 | 10/2003 | Ito et al. |
| 2015/0252736 A1 | 9/2015 | Kurashima |

(Continued)

FOREIGN PATENT DOCUMENTS

| | | |
|---|---|---|
| JP | 2004-211664 A | 7/2004 |
| JP | 2008-267216 A | 11/2008 |

(Continued)

*Primary Examiner* — Sizo Vilakazi
(74) *Attorney, Agent, or Firm* — Drinker Biddle & Reath LLP

(57) ABSTRACT

A fuel injection control device controls a spark-ignition engine of an intra-cylindrical direct fuel injection type. The engine includes a fuel injection valve configured to directly inject a fuel to an interior of a cylinder, and a spark plug configured to ignite, by a spark, an air-fuel mixture inside the cylinder. When the injected fuel collides with a portion in a predetermined low-temperature state, the fuel is injected while changing a fuel injection condition under predetermined operating conditions so as to restrain a fuel spray from keeping colliding with the same position continuously.

4 Claims, 8 Drawing Sheets

(51) Int. Cl.
  *F02D 41/40*  (2006.01)
  *F02B 17/00*  (2006.01)
  *F02F 3/28*   (2006.01)
  *F02F 1/24*   (2006.01)
  *F02D 41/38*  (2006.01)

(56) References Cited

U.S. PATENT DOCUMENTS

2015/0285179 A1* 10/2015 Cohn ................. F02D 41/3094
                                                      701/104
2015/0369162 A1* 12/2015 Cohn ................. F02D 13/0215
                                                      123/406.27
2017/0363035 A1* 12/2017 Cohn ..................... F02P 5/145

FOREIGN PATENT DOCUMENTS

| JP | 2009-36102 A   | 2/2009 |
| JP | 2010-48116 A   | 3/2010 |
| JP | 2013-68128 A   | 4/2013 |
| JP | 2014-173464 A  | 9/2014 |

* cited by examiner

FUEL INJECTION CONTROL DEVICE AND FUEL INJECTION CONTROL METHOD

TECHNICAL FIELD

The present invention relates to fuel injection control for a spark-ignition internal combustion engine of an intra-cylindrical injection type whereby a fuel is injected directly to an interior of a cylinder.

BACKGROUND ART

In a spark-ignition internal combustion engine of an intra-cylindrical injection type, a fuel may attach to a piston crown surface and the like. If an amount of the attached fuel increases and is ignited and combusted by the flame of combustion, the particulate number (PN) will increase. In view of this, to restrain the attachment of the fuel to the piston crown surface, JP 2004-211664A discloses a technique to apply advancing correction to a fuel injection timing during a compression process in accordance with a blow-back amount during a valve overlap period.

In the foregoing document, stratified combustion is performed by injection in the compression process. Furthermore, in the foregoing document, the fuel injection timing during the compression process is advanced to make the distance between a fuel injection valve and a piston crown surface at the time of fuel injection longer than before the correction, thereby reducing an amount of the fuel attached to the piston crown surface.

SUMMARY OF INVENTION

However, with the control according to the foregoing document, during the idling drive for example, an amount of advancing correction is constant and a fuel spray always collides with the same position on the piston crown surface. As a result, an amount of the fuel attached to the piston crown surface increases.

In view of this, the present invention aims to provide a fuel injection control device and a fuel injection control method that can reduce an amount of a fuel attached to a piston crown surface.

According to one embodiment of this invention, a fuel injection control device for a spark-ignition engine of an intra-cylindrical direct fuel injection type, the engine comprising a fuel injection valve configured to directly inject a fuel to an interior of a cylinder; and a spark plug configured to ignite, by a spark, an air-fuel mixture inside the cylinder, is provided. When the injected fuel collides with a portion in a predetermined low-temperature state, the fuel injection control device injects the fuel while changing a fuel injection condition under predetermined operating conditions so as to restrain a fuel spray from keeping colliding with the same position continuously.

DESCRIPTION OF EMBODIMENTS

The following describes an embodiment of the present invention with reference to the attached drawings.

Figure 1:
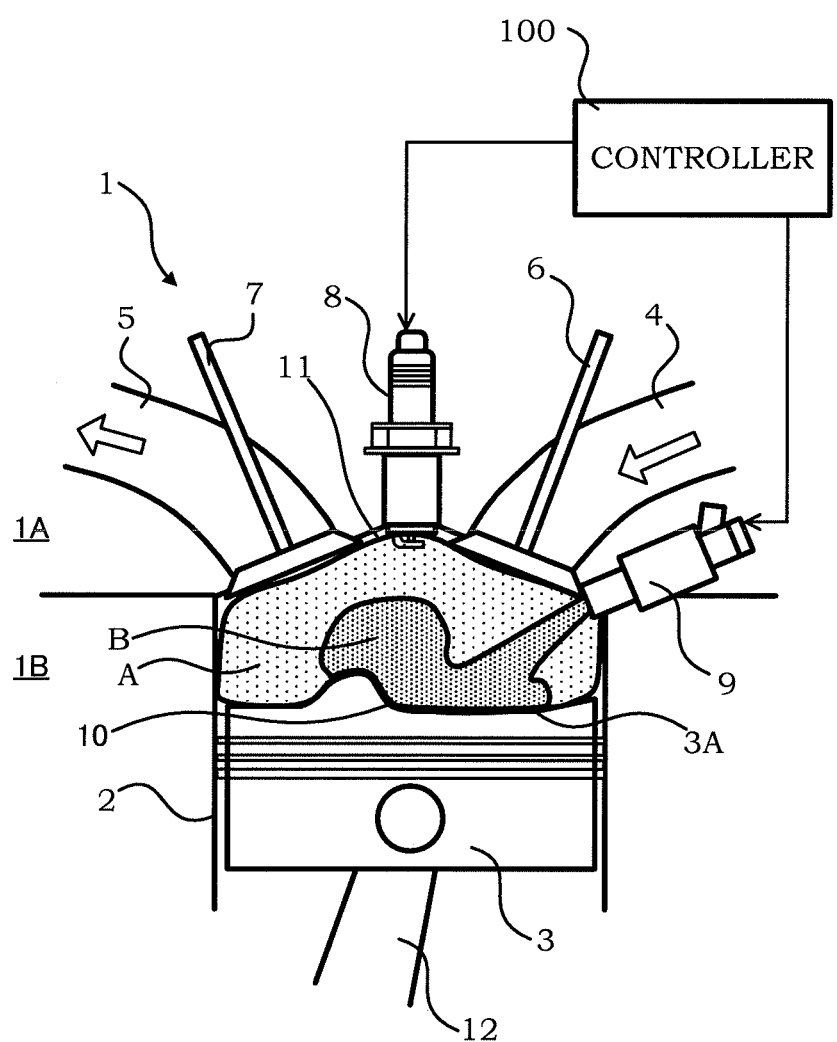
FIG. 1 shows a configuration of an internal combustion engine to which control according to the present embodiment is applied.

FIG. 1 is a schematic configuration diagram showing the vicinity of a combustion chamber of a spark-ignition engine 1 of an intra-cylindrical direct fuel injection type (hereinafter also referred to as an "engine 1") to which the present embodiment is applied. Although FIG. 1 shows only one cylinder, the present embodiment can also be applied to a multi-cylinder engine.

A cylinder block 1B of the engine 1 includes a cylinder 2. A piston 3 is reciprocally housed in the cylinder 2. The piston 3 is joined to a non-illustrated crankshaft via a connecting rod 12, and reciprocates as the crankshaft rotates. A crown surface 3A of the piston 3 (hereinafter also referred to as a piston crown surface 3A) has a later-described cavity 10.

A cylinder head 1A of the engine 1 includes a recessed combustion chamber 11. The combustion chamber 11 is configured in a so-called pent roof style. A pair of intake valves 6 is mounted on an inclined surface of the combustion chamber 11 on the intake side. A pair of exhaust valves 7 is mounted on an inclined surface of the combustion chamber 11 on the exhaust side. A spark plug 8 is located at the substantially central position of the combustion chamber 11 surrounded by the pair of intake valves 6 and the pair of exhaust valves 7, in such a manner that the spark plug 8 extends along an axis line of the cylinder 2.

In the cylinder head 1A, a fuel injection valve 9 is located at a position interposed between the pair of intake valves 6, in such a manner that the fuel injection valve 9 opposes the combustion chamber 11. The directivity of a fuel spray injected by the fuel injection valve 9 will be described later.

The intake valves 6 and the exhaust valves 7 are driven and opened/closed by their respective, non-illustrated camshafts. A valve-opening timing and a valve-closing timing may be variably controlled by providing a valve timing control mechanism on at least one of the intake side and the exhaust side. The valve-opening timing denotes a timing to start a valve-opening operation, whereas the valve-closing timing denotes a timing to end a valve-closing operation. A known mechanism can be used as the valve timing control mechanism. Examples include a mechanism that changes the phase of rotation of the camshafts relative to the crankshaft, and a mechanism that can change not only the phase of rotation but also an operating angle of each valve.

An exhaust gas purifying catalyst for purifying exhaust gas of the engine 1 is disposed in an exhaust passage 5 on the downstream side of the flow of the exhaust gas. The exhaust gas purifying catalyst is, for example, a three-way catalyst.

As stated earlier, the piston crown surface 3A of the piston 3 has the cavity 10. On the piston crown surface 3A, the cavity 10 is located at a position that is closer to the intake side. The fuel injection valve 9 is disposed in such a manner that, when a fuel is injected with the piston 3 located near the top dead center, the fuel spray is directed toward the cavity 10. The shape of the cavity 10 allows the fuel spray that has collided with and bounced off the cavity 10 to be directed toward the spark plug 8.

A controller 100 controls an amount of fuel injection, a fuel injection timing, an ignition timing, and the like of the engine 1 in accordance with an operating state of the engine 1. The fuel injection timing mentioned here denotes a timing to start fuel injection. In order to control them, the engine 1 includes various types of detection devices, such as a crankshaft angle sensor, a cooling water temperature sensor, and an air flow meter that detects an intake air amount.

The following describes control that is performed by the controller 100 when starting the engine 1. In the present embodiment, it will be assumed that so-called two-phase injection is performed, that is, an amount of fuel that is necessary per cycle is injected in two batches.

The exhaust gas purifying catalyst does not exert sufficient purifying performance at temperatures lower than an activation temperature. Therefore, at the time of cold engine start, that is, when the temperature of the exhaust gas purifying catalyst is lower than the activation temperature, it is necessary to promptly increase the temperature of the exhaust gas purifying catalyst. In view of this, when the exhaust gas purifying catalyst is in an inactive state during an idling state immediately after the cold start, the controller 100 executes extremely retarded stratified combustion so as to promptly activate the exhaust gas purifying catalyst. Note that the extremely retarded stratified combustion is commonly known (see JP 2008-25535A).

In the extremely retarded stratified combustion, the controller 100 sets the ignition timing to coincide with, for example, 15 to 30 degrees after the compression top dead center in the first half of an expansion process. Furthermore, the controller 100 sets the first fuel injection timing to coincide with the first half of an intake process, and sets the second fuel injection timing to coincide with the latter half of a compression process so that the fuel spray can reach the vicinity of the spark plug 8 by the ignition timing. For example, the second fuel injection timing is set to coincide with 50 to 60 degrees before the compression top dead center.

A description is now given of an amount of the first fuel injection and an amount of the second fuel injection.

An air-fuel ratio of an exhaust gas discharged in the aforementioned extremely retarded stratified combustion is stoich (a stoichiometric air-fuel ratio). Similarly to a commonly used fuel injection amount setting method, the controller 100 calculates a fuel amount that enables perfect combustion with an intake air amount per cycle (hereinafter also referred to as a total fuel amount). A part of the total fuel amount, for example, 50 to 90% by weight of the total fuel amount is used as the amount of the first injection, and the remaining part is used as the amount of the second injection.

As a result of setting the amounts of fuel injection in the foregoing manner, the fuel spray injected by the first fuel injection diffuses inside the cylinder 2 without colliding with the cavity 10 and mixes with the air, thereby forming a lean homogeneous air-fuel mixture throughout the combustion chamber 11 compared to a case where the stoich is used. On the other hand, the fuel spray injected by the second fuel injection reaches the vicinity of the spark plug 8 by getting lifted up after collision with the cavity 10, thereby intensively forming a rich air-fuel mixture around the spark plug 8 compared to a case where the stoich is used. Consequently, the air-fuel mixture inside the combustion chamber 11 is placed in a stratified state. When the spark plug 8 performs spark-ignition in this state, disturbance-resistant combustion that restrains the occurrence of an accidental fire and smoke takes place. Although the foregoing combustion is the stratified combustion, it will be referred to as the extremely retarded stratified combustion for distinction from commonly used stratified combustion in which the ignition timing is before the compression top dead center. Note that the aforementioned first fuel injection may be divided into two batches. In this case, three-phase injection may be performed, that is, an amount of fuel that is necessary per cycle may be injected in a total of three batches: two in the intake process, and one in the compression process.

The foregoing extremely retarded stratified combustion can not only increase an exhaust temperature, but also reduce an amount of hydrocarbons (HC) discharged from the combustion chamber 11 to the exhaust passage 5, compared to conventional homogeneous stoich combustion. Specifically, the extremely retarded stratified combustion can promptly activate the exhaust gas purifying catalyst while restraining the discharge of HC to the ambient air in a period from the beginning of engine start to the activation of the exhaust gas purifying catalyst compared to a case where warm-up is performed only by the conventional homogeneous stoich combustion, only by the stratified combustion, or in a combustion mode in which a supplementary fuel is further injected in addition to these types of combustion in or after a late stage of combustion (in or after the expansion process, or during an exhaust process).

A part of the fuel that has collided with the piston crown surface 3A during the execution of the extremely retarded stratified combustion attaches to the piston crown surface 3A without proceeding toward the spark plug 8. Even when the fuel has attached to the piston crown surface 3A, no fuel will remain on the piston crown surface 3A if the attached fuel is vaporized and combusted during the corresponding cycle. However, as the extremely retarded stratified combustion is executed at the time of cold engine start, the attached fuel is not easily vaporized until the temperature of the piston crown surface 3A increases. Furthermore, no fuel will remain on the piston crown surface 3A if the attached fuel is combusted by propagation of the flame of combustion in the corresponding cycle. However, in the extremely retarded stratified combustion, as the combustion is started in the expansion process, the flame of combustion may not reach the piston crown surface 3A, or may not reach the piston crown surface 3A at a reduced temperature in the latter half of the expansion process. For these reasons, it is difficult to completely burn off the attached fuel during the corresponding cycle. Note that a phenomenon where the liquid fuel remaining on the piston crown surface 3A is ignited and combusted by the flame of combustion is called a pool fire.

Therefore, the liquid fuel remaining on the piston crown surface 3A keeps increasing for a predetermined period after the cold engine start. The predetermined period mentioned here is a period until an amount by which the liquid fuel remaining on the piston crown surface 3A is vaporized in one cycle exceeds an amount of the fuel that has attached to the piston crown surface 3A in one cycle.

That is, if the extremely retarded stratified combustion is continued for a period longer than the predetermined period, the liquid fuel remaining on the piston crown surface 3A will gradually decrease. However, in some cases, before the predetermined period elapses, there may be a transition from the extremely retarded stratified combustion to the homogeneous stoich combustion with the liquid fuel remaining on the piston crown surface 3A. Examples of such cases include a case where the exhaust gas purifying catalyst has been activated, and a case where acceleration takes place due to depression of an accelerator pedal. Note that the homogeneous stoich combustion mentioned here denotes a combustion mode in which an air-fuel mixture is formed throughout the combustion chamber 11 at the stoichiometric air-fuel ratio, and spark-ignition is performed at the best ignition timing (minimum advance for best torque, or MBT).

If a transition is made to the homogeneous stoich combustion with the liquid fuel remaining on the piston crown surface 3A, the flame of combustion reaches the piston crown surface 3A while maintaining a high temperature, the pool fire occurs, and the remaining liquid fuel is combusted. Such combustion of the liquid fuel that has been accumulated until the current cycle tends to increase PN.

In view of the above, in the present embodiment, the controller 100 performs the following control to reduce the amount of liquid fuel remaining on the piston crown surface 3A.

Figure 2:
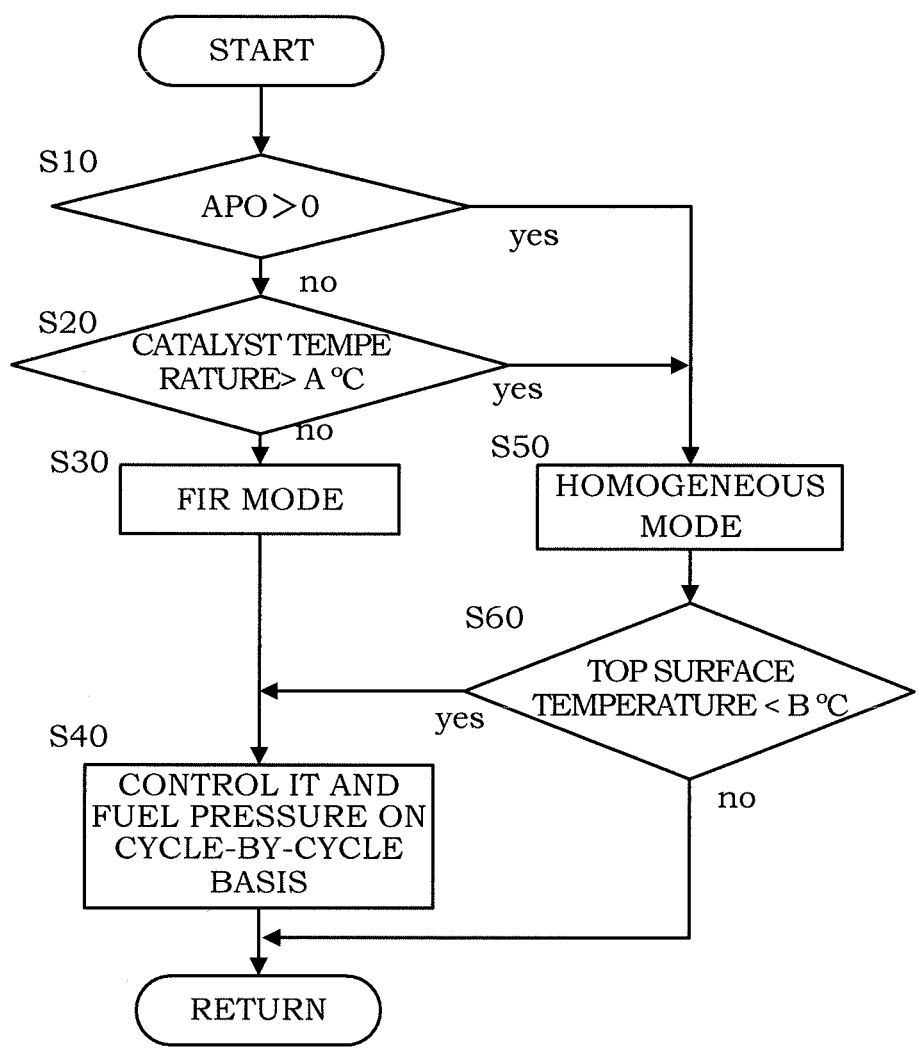
FIG. 2 is a flowchart showing a control routine according to the present embodiment.

FIG. 2 is a flowchart showing a control routine executed by the controller 100. This routine is executed repeatedly in a short cycle (e.g., every 10 milliseconds).

In step S10, the controller 100 determines whether an acceleration request has been made. Specifically, the controller 100 determines whether the accelerator pedal position (the accelerator pedal opening degree), or APO, is larger than zero, that is, whether the accelerator pedal has been depressed. Note that in the present step, it is sufficient to determine whether the acceleration request has been made. Thus, for example, the controller 100 may determine that the acceleration request has been made if the speed of change in the accelerator pedal position is higher than a predetermined value. Alternatively, the controller 100 may determine that the acceleration request has been made if the accelerator pedal position is larger than zero and the speed of change in the accelerator pedal position is higher than the predetermined value.

If the accelerator pedal position is larger than zero, the controller 100 determines that the acceleration request has been made, and executes the homogeneous stoich combustion in step S50. On the other hand, if the accelerator pedal position is zero, the controller 100 determines that the acceleration request has not been made, and executes the process of step S20.

In step S20, the controller 100 determines whether the catalyst temperature is higher than the catalyst activation temperature (A° C.). If the catalyst temperature is higher than the catalyst activation temperature, the controller 100 performs the homogeneous stoich combustion in step S50. On the other hand, if the catalyst temperature is lower than the catalyst activation temperature, the controller 100 executes the extremely retarded stratified combustion (FIR) in step S30 so as to facilitate an increase in the catalyst temperature.

That is, the controller 100 executes the extremely retarded stratified combustion if the catalyst is in an inactive state, and executes the homogeneous stoich combustion if the catalyst is in an active state. Note that if the acceleration request has been made, the homogeneous stoich combustion is executed to achieve acceleration that satisfies the acceleration request.

In step S40, the controller 100 changes a fuel injection timing and a fuel injection pressure (hereinafter also referred to as a "fuel pressure") on a cycle-by-cycle basis as will be described later.

If the homogeneous stoich combustion has been executed in step S50, the controller 100 determines whether the temperature of the piston crown surface 3A, which is a portion that the fuel spray collides with, is lower than a preset temperature (B° C.) in step S60 (hereinafter, the temperature of the piston crown surface 3A is also referred to as the "piston crown surface temperature"). If the piston crown surface temperature is equal to or higher than B° C., the controller 100 ends the present routine. If the piston crown surface temperature is lower than B° C., the controller 100 executes the process of step S40. The preset temperature (B° C.) used in step S60 is the piston crown surface temperature in a state where the liquid fuel remaining on the piston crown surface 3A has decreased with time, for example. Note that the piston crown surface temperature can be estimated from the cylinder wall surface temperature in this state. The cylinder wall surface temperature can be estimated from the cooling water temperature.

As described above, when the acceleration request has not been made, the controller 100 executes the extremely retarded stratified combustion if the catalyst is in the inactive state, and executes the homogeneous stoich combustion if the catalyst is in the active state. When the extremely retarded stratified combustion is executed, the fuel injection timing and the fuel pressure are changed on a cycle-by-cycle basis. Furthermore, even when a homogeneous mode is executed, the controller 100 changes the fuel injection timing and the fuel pressure on a cycle-by-cycle basis if the piston crown surface temperature is lower than B° C. at which the liquid fuel can be accumulated on the piston crown surface 3A.

It is not necessarily the case that both of the fuel injection timing and the fuel pressure need to be changed. Only one of the fuel injection timing and the fuel pressure may be changed as long as the foregoing advantageous effects can be achieved. Furthermore, the fuel injection timing and the fuel pressure are not limited to being changed on a cycle-by-cycle basis, and may be changed every few cycles or in irregular cycles. A still another embodiment may be adopted as long as it can restrain the occurrence of a situation in which the liquid fuel is continuously sprayed at the same portion and does not easily dry with the continuous use of (i.e., without changing) the basic fuel injection condition (the fuel injection timing or the fuel pressure) that is calculated by the controller 100 under predetermined (the same) engine operating conditions.

These "predetermined engine operating conditions" denote environmental conditions (an intake air amount, a temperature, a requested torque, etc.) under which various control parameters are successively calculated while the engine is operating. Specifically, in contrast to conventional cases where control is performed using the same fuel injection conditions (the fuel injection timing and the fuel pressure) under the predetermined (the same) engine operating conditions, the present embodiment performs control to deliberately change the fuel injection condition(s) (at least one of the fuel injection timing and the fuel pressure) and shift the position to which the fuel attaches with micro-level passing of time, even under the predetermined (the same) engine operation conditions. Furthermore, it is sufficient that the advantageous effect of restraining an increase in PN be achieved by the amount of the shift in the position to which the fuel attaches. There is no need to cause a larger-than-necessary shift.

Note that when the extremely retarded stratified combustion is executed, the determination about the crown surface temperature is not made because step S20 doubles as the determination about the crown surface temperature. Specifically, the catalyst can be placed in the inactive state at the time of cold engine start or upon exiting the idling stop or the fuel cut, that is, when the piston crown surface temperature is low. Therefore, it can be estimated that the piston crown surface temperature is low if the catalyst temperature is lower than the activation temperature in step S20.

A description is now given of the process of step S40.

As described above, in step S40, the controller 100 changes a fuel injection timing and a fuel pressure on a cycle-by-cycle basis. This is intended to change the position with which the fuel spray collides on the piston crown surface 3A (also referred to as a fuel collision position) on a cycle-by-cycle basis. If the fuel collision position does not change, the fuel spray in the next cycle collides with the fuel collision position before vaporization of the fuel that has attached to the piston crown surface 3A. Repetition of such collision leads to the accumulation of the liquid fuel at the fuel collision position. To restrain such accumulation of the liquid fuel, the controller 100 performs fuel injection control to shift the position of fuel injection in the current cycle from the fuel collision position in the previous cycle. The following describes three patterns of fuel injection control that can shift the position of fuel injection in the current cycle from the fuel collision position in the previous cycle.

(First Pattern)

A first pattern is a pattern in which the controller 100 changes the fuel injection timing while keeping the fuel pressure constant.

Figure 3:
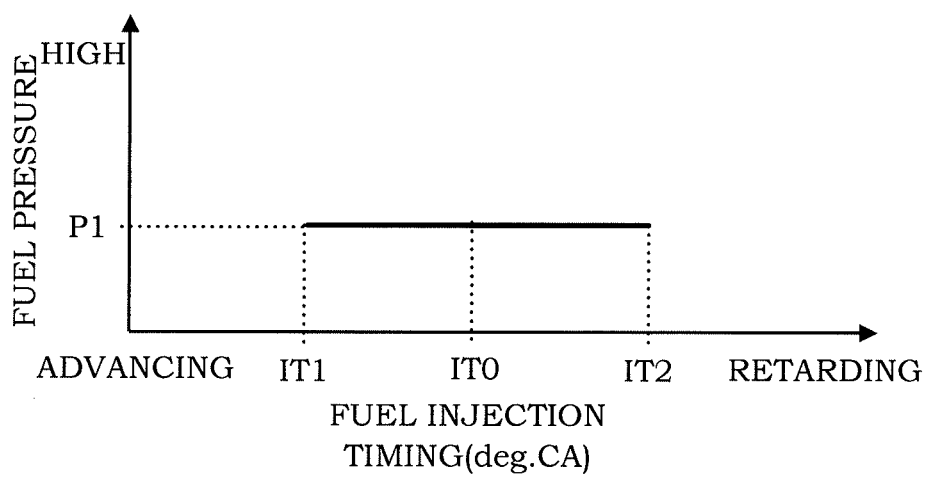
FIG. 3 is a table showing a range in which a fuel injection timing can be changed.
Figure 4:
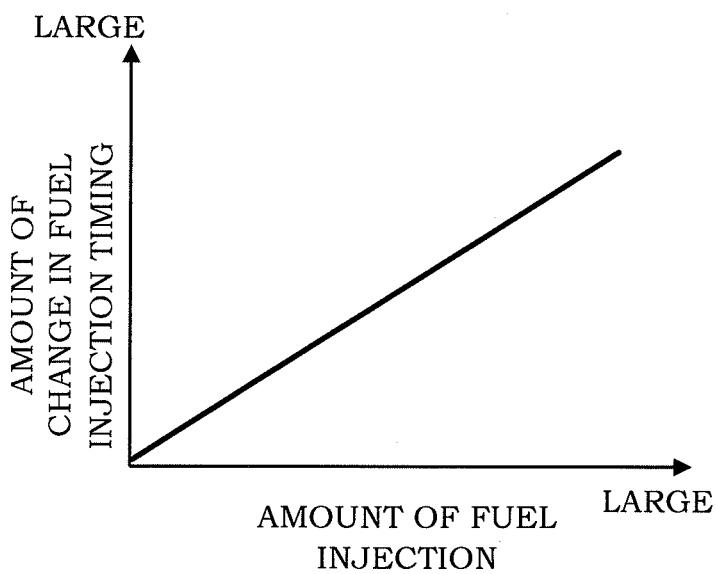
FIG. 4 is a table showing a relationship between an amount of change in the fuel injection timing and an amount of fuel injection under the constant fuel pressure.

FIG. 3 is a table showing a range in which the fuel injection timing can be changed. In FIG. 3, a vertical axis represents the fuel pressure, a horizontal axis represents the fuel injection timing, and IT0 represents a reference fuel injection timing (a basic fuel injection timing) used in the execution of the extremely retarded stratified combustion. FIG. 4 is a table showing a relationship between an amount of change in the fuel injection timing and an amount of fuel injection under the constant fuel pressure.

To restrain the accumulation of the liquid fuel on the piston crown surface 3A, it is preferable to prevent the fuel spray from colliding with the same position on the piston crown surface 3A. Under the constant fuel pressure, the larger the amount of fuel injection, the longer the period of injection. In view of this, as shown in FIG. 4, the amount of change in the fuel injection timing is increased as the amount of fuel injection increases. Note that if the amount of change in the fuel injection timing is increased to the extent that the fuel spray no longer collides with the cavity 10, a stratified air-fuel mixture is not easily formed around the spark plug, with the result that the stability degree of combustion decreases in an extremely retarded stratified combustion mode. In view of this, as shown in FIG. 3, an advancing limit IT1 and a retarding limit IT2 are set so as to achieve a reliable stability degree of combustion despite the change in the fuel injection timing.

Although the amount of fuel injection barely changes during the execution of the extremely retarded stratified combustion, the amount of fuel injection changes during the execution of the homogeneous stoich combustion in accordance with the engine operating state. For this reason, it is meaningful to define the relationship between the amount of fuel injection and the amount of change in the fuel injection timing as in FIG. 4.

In the extremely retarded stratified combustion, as the fuel spray that has collided with the piston crown surface 3A needs to be reflected toward the spark plug 8 and form a stratified air-fuel mixture, it is necessary to take into consideration whether the fuel spray will be reflected in setting the advancing limit IT1 and the retarding limit IT2. On the other hand, in the homogeneous stoich combustion, it is sufficient to take into consideration mainly the ease of evaporation of the fuel that has attached to the piston crown surface 3A.

(Second Pattern)

A second pattern is a pattern in which the controller 100 changes the fuel pressure while keeping the fuel injection timing constant.

Figure 5:
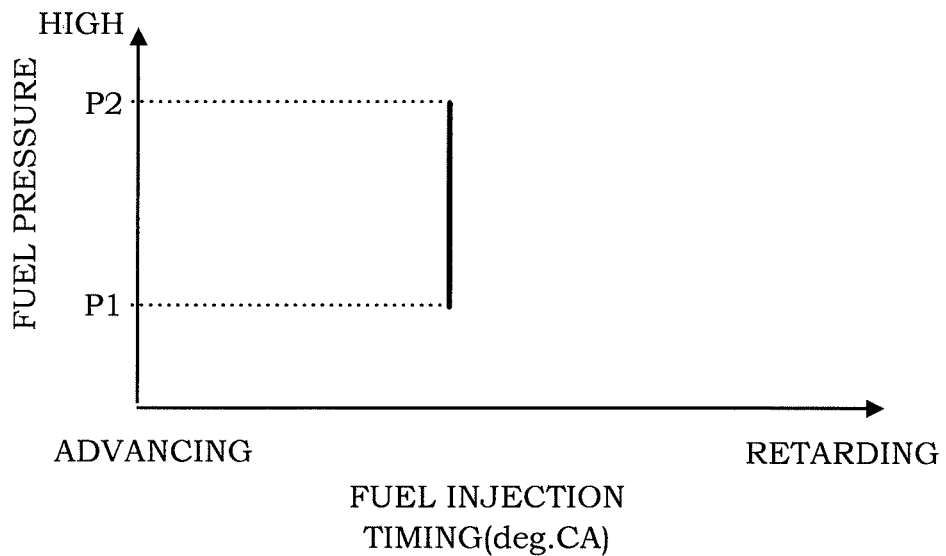
FIG. 5 is a table showing a range in which a fuel pressure can be changed.
Figure 6:
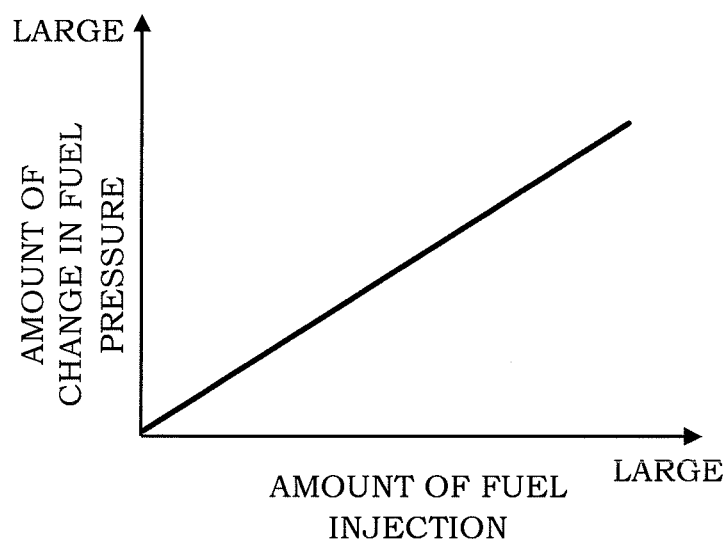
FIG. 6 is a table showing a relationship between an amount of change in the fuel pressure and an amount of fuel injection under the constant fuel injection timing.

FIG. 5 is a table showing a range in which the fuel pressure can be changed in the second pattern. In FIG. 5, a vertical axis represents the fuel pressure, a horizontal axis represents the fuel injection timing, and P1 represents a reference fuel pressure (a basic fuel pressure) used in the execution of the extremely retarded stratified combustion. FIG. 6 is a table showing a relationship between an amount of change in the fuel pressure and an amount of fuel injection under the constant fuel injection timing.

Even if the fuel injection timing is fixed, changing the fuel pressure will change the speed of and the distance reached by the fuel spray, thereby changing the fuel collision position on the piston crown surface 3A. For example, even if the fuel injection timing remains the same, increasing the fuel pressure will shorten the period required for the fuel spray to collide with the piston 3; as a result, when the fuel spray collides with the piston 3, the piston 3 is located closer to the bottom dead center than before the fuel pressure is reduced. As the direction of injection from the fuel injection valve 9 is constant, the shift in the piston position toward the bottom dead center will shift the fuel collision position on the piston crown surface 3A as well.

As shown in FIG. 6, the amount of change in the fuel pressure is increased as the amount of fuel injection increases. Note that the lower the fuel pressure, the more difficult for the fuel to be atomized, and the lower the stability of combustion in both of the extremely retarded stratified combustion and the homogeneous stoich combustion. Furthermore, the lower the fuel pressure, the more difficult for the fuel spray to be reflected after collision with the piston crown surface 3A, the more difficult it is to form a stratified air-fuel mixture around the spark plug, and the lower the stability of combustion in the extremely retarded stratified combustion mode. Moreover, the limit of the fuel pressure on the high pressure side is defined by, for example, the performance of a fuel pump. In view of the above, as shown in FIG. 5, a low pressure limit P1 and a high pressure limit P2 are set on the basis of the property of fuel atomization, the stability degree of combustion, the performance of the fuel pump, and the like, and the low pressure limit P1 is used as the basic fuel pressure. That is, in the present embodiment, "changing the fuel pressure" means increasing the fuel pressure. Note that the basic fuel pressure may be set to be higher than the low pressure limit P1.

(Third Pattern)

A third pattern is a pattern in which the controller 100 changes the fuel pressure and the fuel injection timing.

Figure 7:
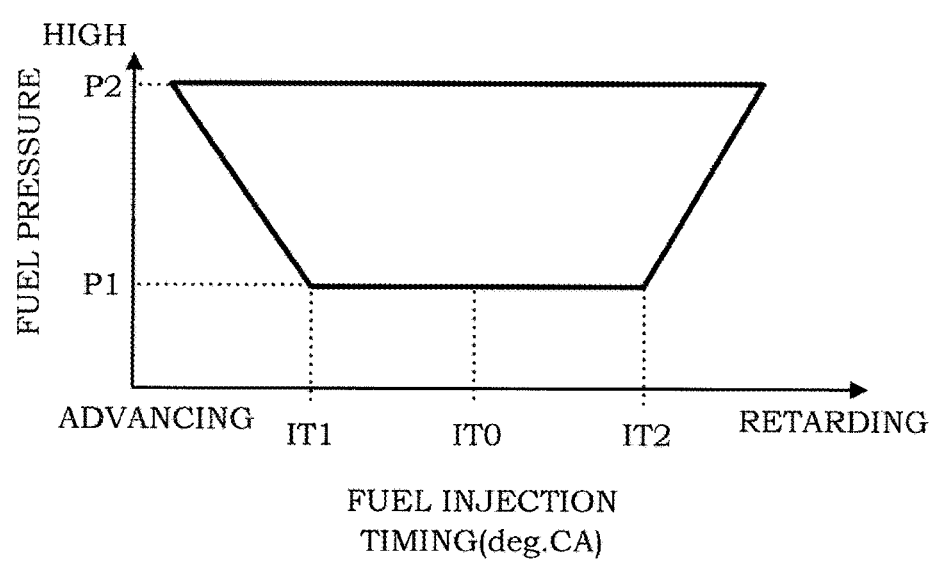
FIG. 7 is a map showing the ranges in which the fuel pressure and the fuel injection timing can be changed.

FIG. 7 is a map showing the ranges in which the fuel pressure and the fuel injection timing can be changed in the third pattern. In FIG. 7, the range in which the fuel injection timing can be changed is wider when the fuel pressure P2 is used than when the fuel pressure P1 is used for the following reasons. Firstly, as the fuel pressure increases, the fuel spray is more finely atomized, the momentum of the fuel spray increases, and the stability degree of combustion increases. Secondly, as the fuel pressure increases, the speed of and the distance reached by the fuel spray increase; therefore, even if the distance from the fuel injection valve 9 to the piston crown surface 3A is increased at the fuel injection timing, the fuel spray can be reflected by the piston crown surface 3A and form a stratified air-fuel mixture around the spark plug 8, and the stability degree of combustion increases.

Figure 8:
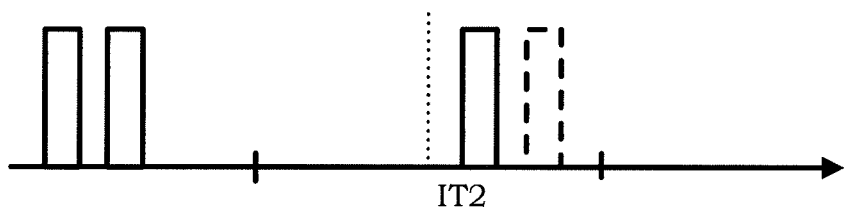
FIG. 8 shows an example of how to change the fuel injection timing.
Figure 8:
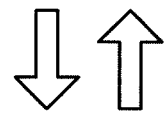
Figure 8:
Figure 8:
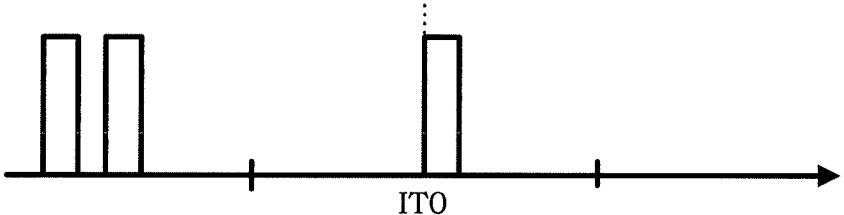
Figure 8:
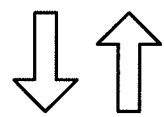
Figure 8:
Figure 8:
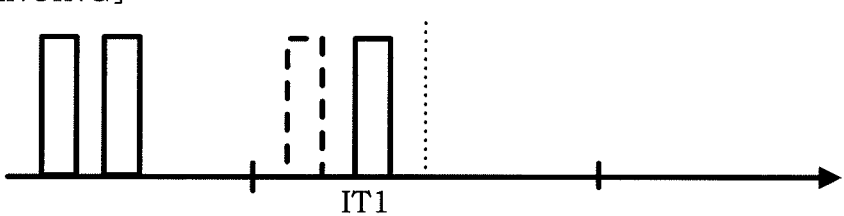

Specifically, as shown in FIG. 8, if the fuel pressure is kept constant, the fuel injection timing can be changed only within a range of the advancing limit IT1 to the retarding limit IT2; in contrast, if the fuel pressure is also changed, the range in which the fuel injection timing can be changed can be expanded to a range indicated by dash lines in FIG. 8. The fuel collision position on the piston crown surface 3A can be shifted in any of the foregoing patterns. In the present embodiment, the controller 100 carries out the third pattern that changes the fuel pressure and the fuel injection timing.

Note that in FIG. 8, the order may be changed to any of the following orders: reference→retarding→reference→advancing→reference . . . ; reference→retarding→advancing→reference→retarding→advancing . . . .

In step S40, the controller 100 performs fuel injection control on the basis of one of the aforementioned first to third patterns. In any type of fuel injection control, the fuel injection timing and the fuel pressure are changed so that the fuel spray concentrates around the spark plug 8 during the execution of the extremely retarded stratified combustion. Although the cavity 10 fulfills a function of directing the fuel spray that has collided therewith toward the spark plug 8, the fuel spray need not necessarily collide with the cavity 10 to be reflected toward the spark plug 8. For example, the momentum of the fuel spray can be increased by increasing the fuel pressure, so that the fuel spray that has collided with a position that is displaced from the cavity 10 of the piston crown surface 3A concentrates around the spark plug 8, either directly or after being reflected by a cylinder wall again.

The following describes the operational effects of the present embodiment.

Figure 9:
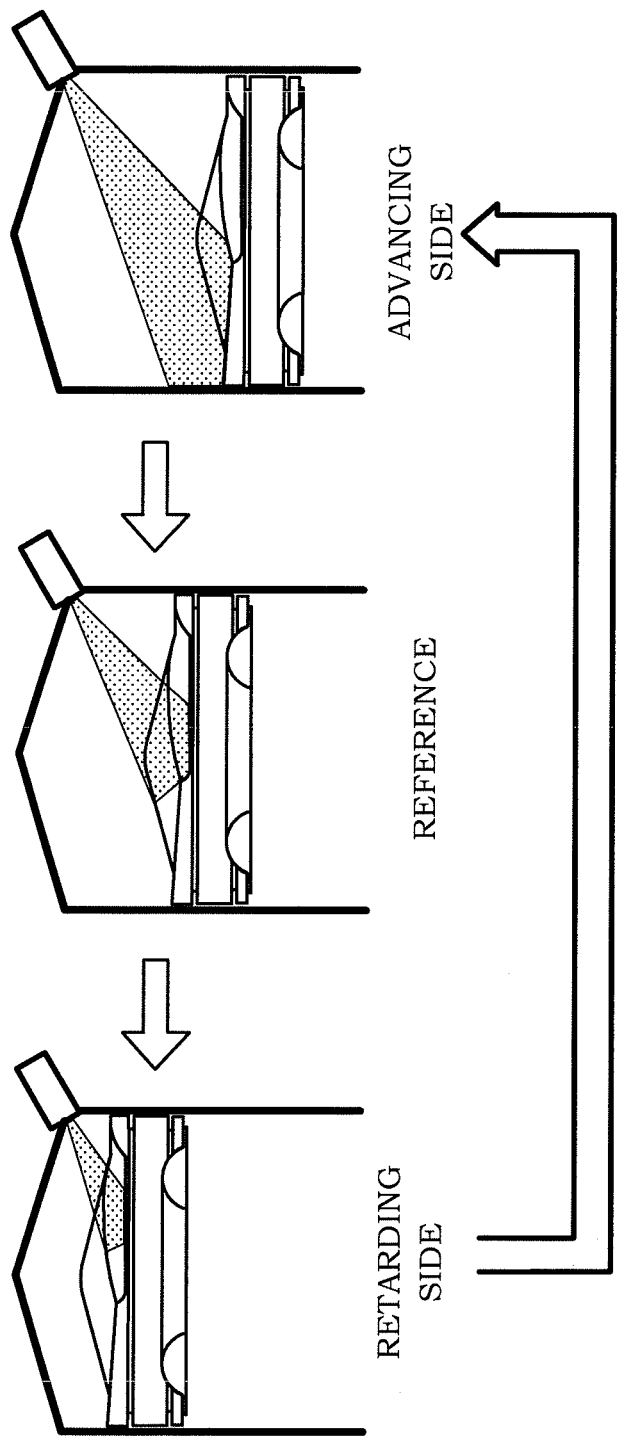
FIG. 9 shows a relationship between a fuel spray collision position on a piston crown surface and the fuel injection timing.

FIG. 9 shows a relationship between the fuel spray and the piston 3 for a case where the fuel injection timing and the fuel pressure are changed in the following order on a cycle-by-cycle basis during the execution of the extremely retarded stratified combustion: reference→advancing→retarding→reference→advancing . . . .

At the reference position, the fuel spray collides with the vicinity of the center of the piston crown surface 3A including the cavity 10. In the next cycle, the fuel injection timing is changed to the retarding side, and the fuel spray collision position is shifted rightward in the figure from the fuel spray collision position in the case of the reference position. In the still next cycle, the fuel injection timing is changed to the advancing side, and the fuel spray collision position is shifted leftward in the figure from the fuel spray collision position in the case of the reference position.

Figure 10:
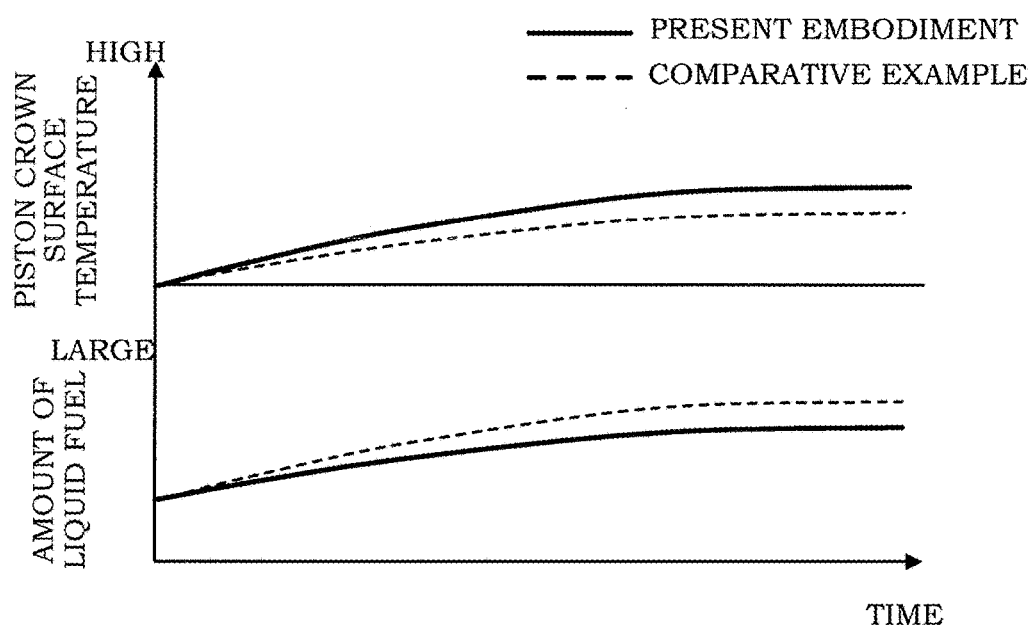
FIG. 10 illustrates the advantageous effects achieved by performing control according to the present embodiment.

FIG. 10 is a timing chart showing the piston crown surface temperature and the amount of liquid fuel for a case where the fuel injection control shown in FIG. 9 is executed. A timing chart for a case where the fuel injection timing and the fuel pressure are not changed are indicated by dash lines as a comparative example.

According to the comparative example, the fuel spray collides with the same position on the piston crown surface 3A in every cycle. Thus, when the piston crown surface temperature is low, such as at the time of cold engine start, the fuel spray in the next cycle collides with the piston crown surface 3A before vaporization of the fuel that has attached to the piston crown surface 3A in the previous cycle. For this reason, the fuel that has attached to the piston crown surface 3A easily forms a liquid film. The formation of the liquid film creates a vicious cycle in which the piston crown surface temperature is less likely to increase, and the amount of liquid fuel increases.

In contrast, according to the present embodiment, the fuel spray collision position on the piston crown surface 3A is changed on a cycle-by-cycle basis. Thus, time to vaporize the fuel that has attached to the piston crown surface 3A can be earned. As a result, the vicious cycle caused by the comparative example is less likely to occur. Furthermore, compared to the comparative example, the piston crown surface temperature easily increases, and the amount of liquid fuel accumulated on the piston crown surface 3A can be restrained.

Although the fuel injection timing and the fuel injection pressure are changed on a cycle-by-cycle basis in the present embodiment, no limitation is intended in this regard. For example, they may be changed every few cycles or randomly as long as the fuel spray can be restrained from keeping colliding with the same position on the piston crown surface 3A or a cylinder wall surface continuously. In this context, "continuously" means in such a successive manner that the liquid fuel is accumulated on the piston crown surface 3A or the cylinder wall surface. The relationship between the extent of successive collisions and the amount of accumulated liquid fuel varies depending on a variety of factors, such as the pattern of fuel injection (the shape of the spray), the shape of the piston crown surface 3A, and the amount of single fuel injection. Therefore, this relationship is examined in advance through experiments and the like.

As described above, in the present embodiment, when the portion with which the injected fuel collides is in a predetermined low-temperature state, the fuel is injected while changing the fuel injection condition(s) under the predetermined operating conditions so as to restrain the fuel spray from keeping colliding with the same position continuously. Specifically, when the piston crown surface temperature is lower than a predetermined temperature, the fuel is injected while changing the fuel spray collision position on the piston crown surface 3A on a cycle-by-cycle basis. This restrains regional attachment of the fuel to the piston crown surface 3A. Therefore, the accumulation of the liquid fuel on the piston crown surface 3A can be restrained.

The present embodiment has dealt with a case where the portion with which the fuel spray collides is the piston crown surface 3A. However, when the portion with which the fuel spray collides is the cylinder wall surface, the control according to the present embodiment can be applied to restrain the accumulation of the fuel caused by the continuous collision between the fuel spray and the same position on the cylinder wall surface.

In the present embodiment, the fuel injection timing is changed to change the fuel spray collision position on the piston crown surface 3A. This can restrain the accumulation of the liquid fuel on the piston crown surface 3A. In the present embodiment, the injection in the expansion process, in which the fuel injection timing and the fuel pressure are changed, is intended to inject the fuel provided for so-called main combustion. Alternatively, this injection may be applied to so-called posterior injection and after injection. This is because the fuel injected through these types of fuel injection can also be the cause of an increase in PN if it is accumulated on the piston crown surface 3A and the like.

In the present embodiment, by changing the fuel injection pressure, the fuel spray is restrained from keeping colliding with the same position continuously. Changing the fuel pressure will change, for example, the travelling distance of the fuel spray, thereby changing the fuel collision position on the piston crown surface 3A. As a result, the accumulation of the liquid fuel on the piston crown surface 3A can be restrained as in the case where the fuel injection timing is changed. The injection in the expansion process, in which the fuel injection pressure is changed, may be so-called posterior injection and after injection as in the case where the fuel injection timing is changed.

Furthermore, the fuel injection timing and the fuel injection pressure may be changed. In this case, for example, the fuel pressure that can achieve a reliable stability degree of combustion is used as a reference, and an amount of increase in the fuel pressure from the reference is adjusted in accordance with an amount of change in the fuel injection timing. Increasing the fuel pressure will facilitate finer atomization of the fuel spray, increase the momentum of the fuel spray, and increase the stability degree of combustion. As a result, a reduction in the stability degree of combustion can be restrained, even if the fuel spray that deviates from the cavity 10 increases due to the change in the fuel injection timing.

When the fuel injection timing and the fuel injection pressure are changed, an amount of change in the fuel injection timing is increased as the fuel pressure increases. In this way, compared with a case where the fuel pressure is not changed, an amount of change in the fuel spray collision position on the piston crown surface 3A increases, and thus the attachment of the liquid fuel to the piston crown surface 3A is easily restrained.

In the present embodiment, the amounts of change in the fuel injection timing and the fuel pressure are increased as the amount of fuel injection increases. As the amount of fuel injection increases, an injection pulse becomes longer, an amount of piston movement during an injection period increases, and the fuel spray collision position on the piston crown surface 3A in one cycle occupies a wider range. In view of this, as in the present embodiment, the amounts of change in the fuel injection timing and the fuel pressure are increased as the amount of fuel injection increases. In this way, the fuel spray collision positions on the piston crown surface 3A in successive cycles can be restrained from overlapping one another.

Although the present embodiment as described above is applied to the engine 1 of a so-called side injection type whereby the fuel injection valve 9 is located on the side of the combustion chamber, the present embodiment can similarly be applied to the engine 1 of a so-called vertical injection type whereby the fuel injection valve 9 is located in the vicinity of an apical portion of the combustion chamber.

The above-described embodiment of the present invention merely illustrates a part of example applications of the present invention, and the specific configurations of the above-described embodiment are not intended to limit a technical scope of the present invention.

The invention claimed is:

1. A fuel injection control device for a spark-ignition engine of an intra-cylindrical direct fuel injection type, the engine comprising:
   a fuel injection valve configured to directly inject a fuel to an interior of a cylinder; and
   a spark plug configured to ignite, by a spark, an air-fuel mixture inside the cylinder,
   wherein
   when the injected fuel collides with a portion in a predetermined low-temperature state, the fuel is injected while changing a fuel injection timing and a fuel injection pressure under predetermined operating conditions so as to restrain a fuel spray from keeping colliding with the same position continuously, and
   an amount of change in the fuel injection timing is increased as the fuel injection pressure increases.

2. The fuel injection control device according to claim 1, wherein
   an amount of change in the fuel injection timing is increased as an amount of fuel injection increases.

3. The fuel injection control device according to claim 1, wherein
   an amount of change in the fuel injection pressure is increased as an amount of fuel injection increases.

4. A fuel injection control method for a spark-ignition engine of an intra-cylindrical direct fuel injection type, the engine comprising:
   a fuel injection valve configured to directly inject a fuel to an interior of a cylinder; and
   a spark plug configured to ignite, by a spark, an air-fuel mixture inside the cylinder,
   the fuel injection control method comprising:
   when the injected fuel collides with a portion in a predetermined low-temperature state, injecting the fuel while changing a fuel injection timing and a fuel injection pressure under predetermined operating conditions so as to restrain a fuel spray from keeping colliding with the same position continuously; and
   increasing an amount of change in the fuel injection timing as the fuel injection pressure increases.

* * * * *